(12) United States Patent
McDaid

(10) Patent No.: US 11,125,292 B1
(45) Date of Patent: Sep. 21, 2021

(54) RIGID FRICTION BRAKE TETHER

(71) Applicant: Sherrill, Inc., Greensboro, NC (US)

(72) Inventor: Cornelius McDaid, Randolph, MA (US)

(73) Assignee: Sherrill, Inc., Greensboro, NC (US)

( * ) Notice: Subject to any disclaimer, the term of this patent is extended or adjusted under 35 U.S.C. 154(b) by 0 days.

(21) Appl. No.: 17/321,648

(22) Filed: May 17, 2021

Related U.S. Application Data

(63) Continuation of application No. 17/247,360, filed on Dec. 9, 2020.

(51) Int. Cl.
  *A62B 1/14* (2006.01)
  *F16D 65/16* (2006.01)
  *F16D 63/00* (2006.01)

(52) U.S. Cl.
  CPC .............. *F16D 65/16* (2013.01); *A62B 1/14* (2013.01); *F16D 63/008* (2013.01)

(58) Field of Classification Search
  CPC .......... A62B 1/14; A62B 1/18; F16D 63/008; A63B 29/02
  See application file for complete search history.

(56) References Cited

U.S. PATENT DOCUMENTS

| | | | |
|---|---|---|---|
| 8,851,232 B2 | 10/2014 | Bingham |
| 10,695,590 B1 | 6/2020 | Brown |
| 2019/0314650 A1 | 10/2019 | Cowell et al. |

OTHER PUBLICATIONS

Zag Wrench Tether, Web page <https://www.tree-minded.com/p/tether.html>, 1 page, printed Mar. 10, 2020.
Reon Rounds Tether, Web page <https://reonroundsdesigns.com/collections/frontpage/products/reon-rounds-tether>, 1 page, printed Mar. 10, 2020.
Petzl Chicane Descender, Web page <https://www.petzl.com/US/en/Professional/Descenders/CHICANE>, 1 pages, printed Mar. 10, 2020.

*Primary Examiner* — Bradley T King
(74) *Attorney, Agent, or Firm* — Altman & Martin; Steven K Martin

(57) ABSTRACT

A rigid tether for use with a friction brake. The tether has a rigid handle with a brake hole at one end designed for mounting a friction brake to rotate about the brake hole. A pulley arm with pulley is attached to rotate about the other end of the handle. The pulley arm is two parallel plates, a fixed plate and a gate plate, with an axle between them on which is mounted the pulley. The plates, pulley, and handle define a rope slot. The gate plate can pivot on the axle to provide access to the rope slot.

24 Claims, 13 Drawing Sheets

RIGID FRICTION BRAKE TETHER

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to tree climbing apparatus, and more particularly to an apparatus for rope climbing using a stationary rope system.

2. Description of the Related Art

It is known in the art of tree climbing, and specifically rope assisted tree climbing, to use a stationary rope system (SRS). In SRS, one end of a line of rope is anchored to a fixed object, such as to a branch or trunk of a tree, which is the tie-in point of the system. The climber attaches to the free end of the line using a separate rope grabbing component such as a friction hitch or mechanical device. The climber ascends the free end of the line using his/her arms and legs, and optionally, an additional mechanical ascender for assistance.

A friction brake that acts as a descender is described in U.S. Pat. No. 8,851,232. The top end of a flexible tether is connected to the handle of the friction brake, and the bottom end of the tether is connected to a hitch tending pulley. The tether should be long enough that it does not restrict the pivoting movement of the friction brake and does not interfere with the below-described friction hitch but should not be so long that it easily twists around the climbing rope. The climbing rope is inserted through the slot in the friction brake and then through the hitch tending pulley. A friction hitch, such as a split tail Blake's hitch or similar, is placed on the climbing rope between the friction brake and the hitch tending pulley and attached to the hitch tending pulley. A carabiner is attached to the hitch tending pulley for securely connecting the hitch tending pulley to the climber.

When ascending the rope, the friction brake is in the neutral position. The climber may use a conventional ascender to assist in the ascent. The climber pulls the friction brake up the rope as the climber ascends.

When the climber desires to descend, the climber engages the friction brake by pulling it downward so that the friction brake is in the brake position. Typically, this is done by grasping the tether and pulling downwardly. After the friction brake is in the brake position, the climber then can disengage the friction hitch and slowly descend down the rope.

The flexible tether does not engage the friction brake in optimal position because it is not able to remain in the same plane as the friction brake. Further, the top and bottom attachment points are not necessarily aligned due to the flex of the tether.

The ancillary components, such as the pulley, are not fully integrated into the design. The lack of integration between the friction brake, friction hitch, carabiner, flexible tether, and pulley results in an assembly that is not stable. In other words, the various components do not remain in the same positions and orientations relative to each other.

Textile tethers, those made from cordage, absorb moisture and debris over time, causing the tether to progressively loose rigidity. Loss of rigidity forces the climber to use more energy during the climbing process.

BRIEF SUMMARY OF THE INVENTION

The present invention is a rigid tether for use with a friction brake. The tether has a handle with a pulley arm with a pulley at one end. The handle is generally straight and long enough for a person to grip. Optionally, the handle is shaped to provide a comfortable grip.

At one end of the handle is a through brake hole is for attaching the friction brake. On the right side of the handle, a collar is secured into a circular groove that surrounds brake hole so that the collar rotates within the hole between stops. A jaw protrudes from the collar to capture the friction brake when attached to the tether.

At the other end of the handle is a pulley arm that is two elongated, parallel plates, a fixed plate and a gate plate, with an axle between them. The pulley is mounted to spin on the axle. The pulley arm is mounted to rotate about a pulley hole in the handle. The fixed plate, gate plate, pulley, and handle define a rope slot. Optionally, the gate plate can pivot on the axle to provide access to the rope slot.

The friction brake has two elongated side members. Two parallel friction elements extend between the side members at one end. A tethering connector extends between the side members at the other end for connecting to the brake hole of the handle.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present application is a continuation application of U.S. patent application Ser. No. 17/247,360, incorporated herein by reference in its entirety.

Figure 1:
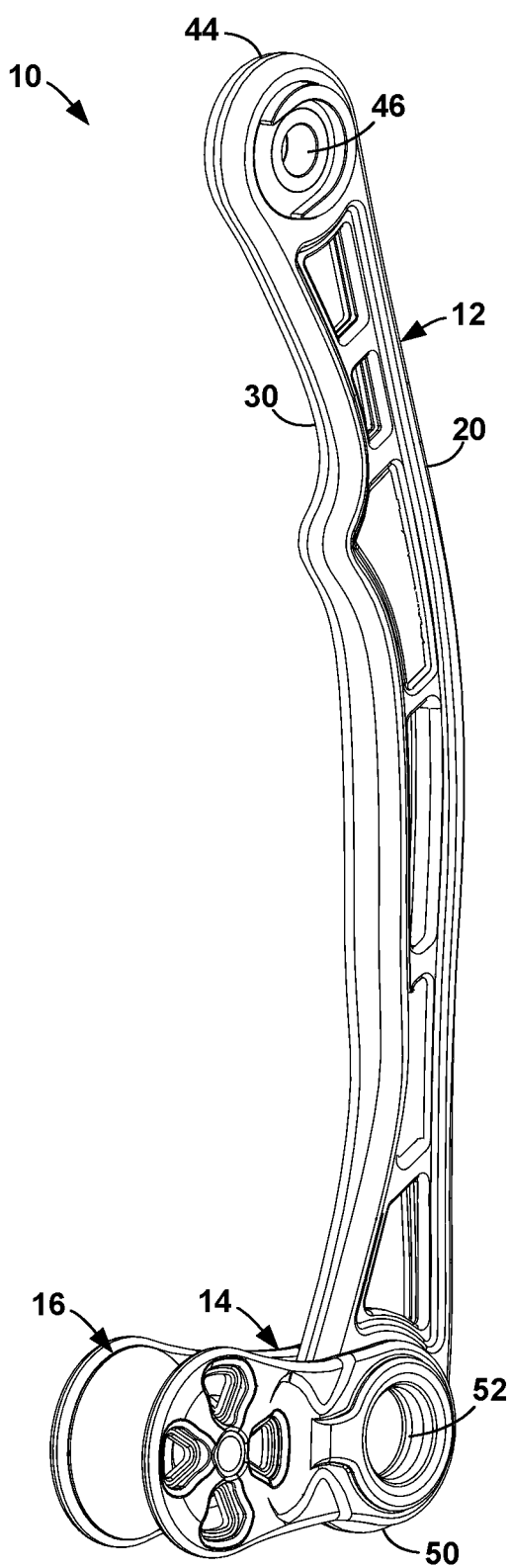
FIG. 1 is a right side, perspective view of the tether of the present invention.
Figure 2:
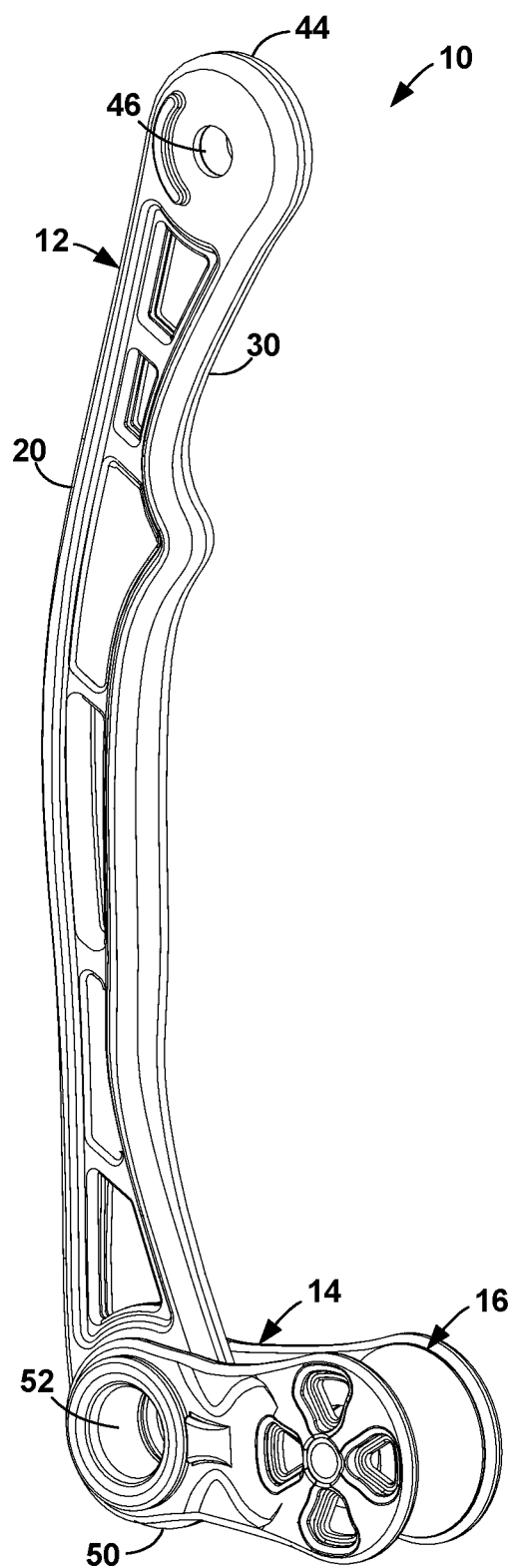
FIG. 2 is a left side, perspective view of the tether of the present invention.
Figure 3:
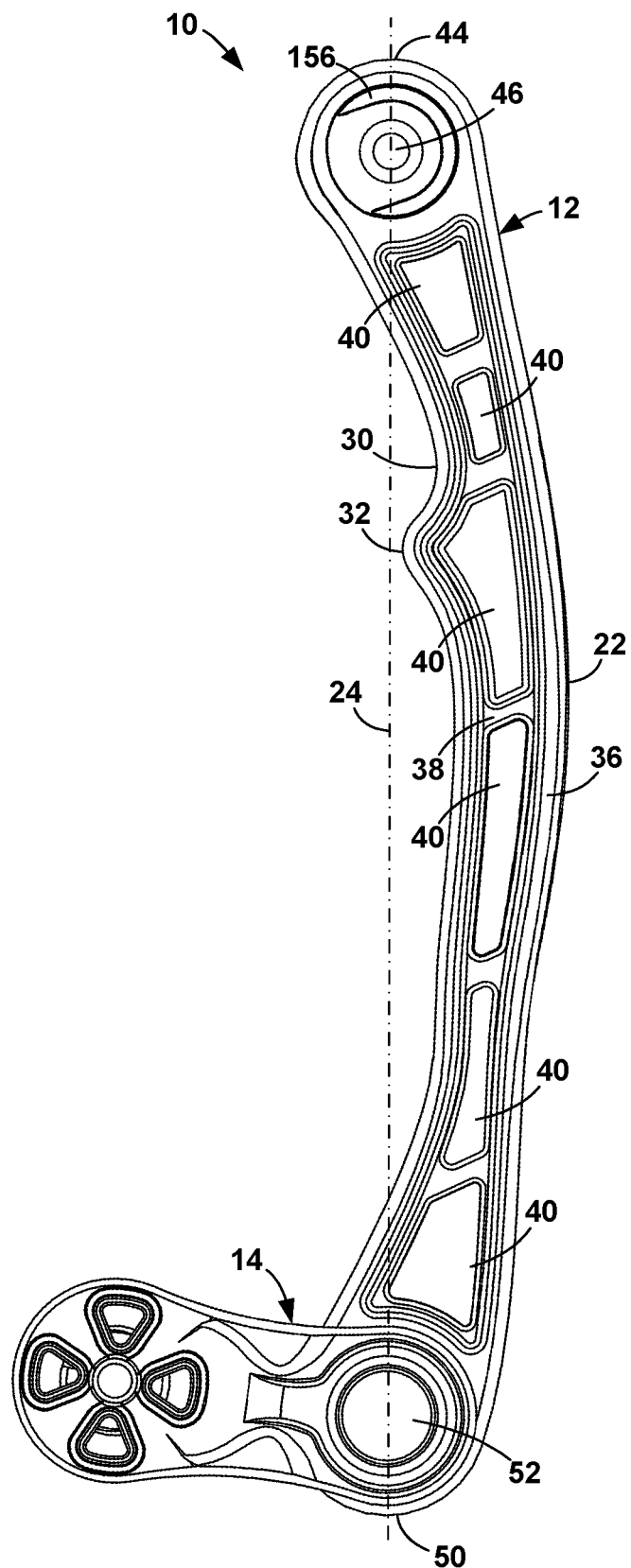
FIG. 3 is a right side view of the tether of the present invention.

The present invention is a rigid tether 10 for use with a friction brake 18 such as that taught by U.S. Pat. No. 8,851,232, incorporated herein by reference. As shown in FIGS. 1-3, the tether 10 has a handle 12 with a pulley arm 16 at one end. The pulley arm 14 has a pulley 16.

The handle 12 is composed of a rigid material so it has minimal flex. Preferred materials are light in weight. Example materials include light metals, such as cast, forged, stamped, or laminated alloys of aluminum, steel, and titanium. Other contemplated materials include carbon composites, extruded and injection molded plastics, and fiberglass.

The handle 12 is generally straight and long enough for a person to grip. Typically, the handle 12 is in the range of from 9 inches to 12 inches long. An axis 24, shown in FIG. 3, is the line that passes through the center of a round brake hole 46 at the upper end 44 and the center of a round pulley hole 52 at the lower end 50.

Optionally, as shown in FIG. 3, the handle 12 is shaped to provide a comfortable grip. In the present design, the handle outside 20 has a generally convex shape, as at 22, such that it fits comfortably in the palm of a user's hand. The handle inside 30 is generally concave and includes a rounded protrusion 32 that is designed to be straddled by the index finger and middle finger of the user's hand.

The central portion of both sides 36 of the handle 12 are depressed, as at 38. The depressions 38 save both material and weight. Slots 40 extending through the handle 12 within the depressions 38 save both material and weight and provide attaching points for carabiners.

Figure 5:
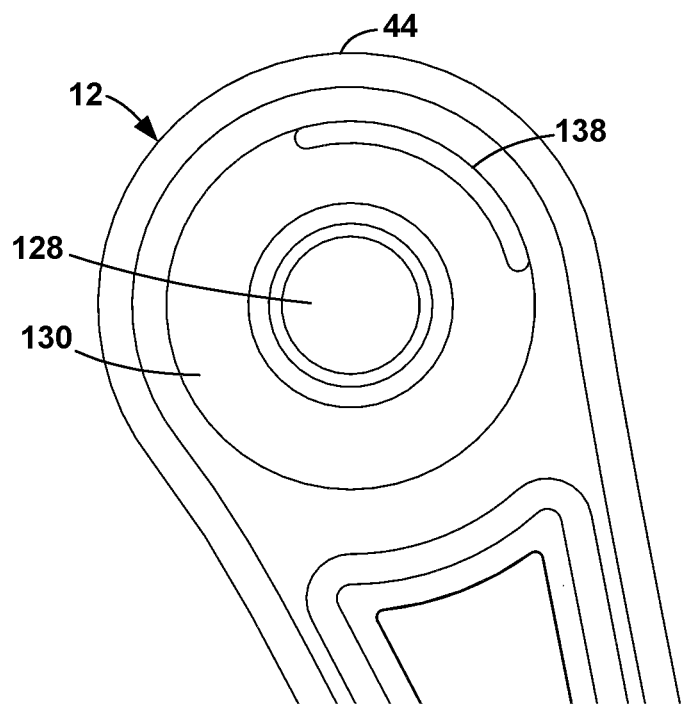
FIG. 5 is a side perspective view of the brake hole in the handle.
Figure 6:
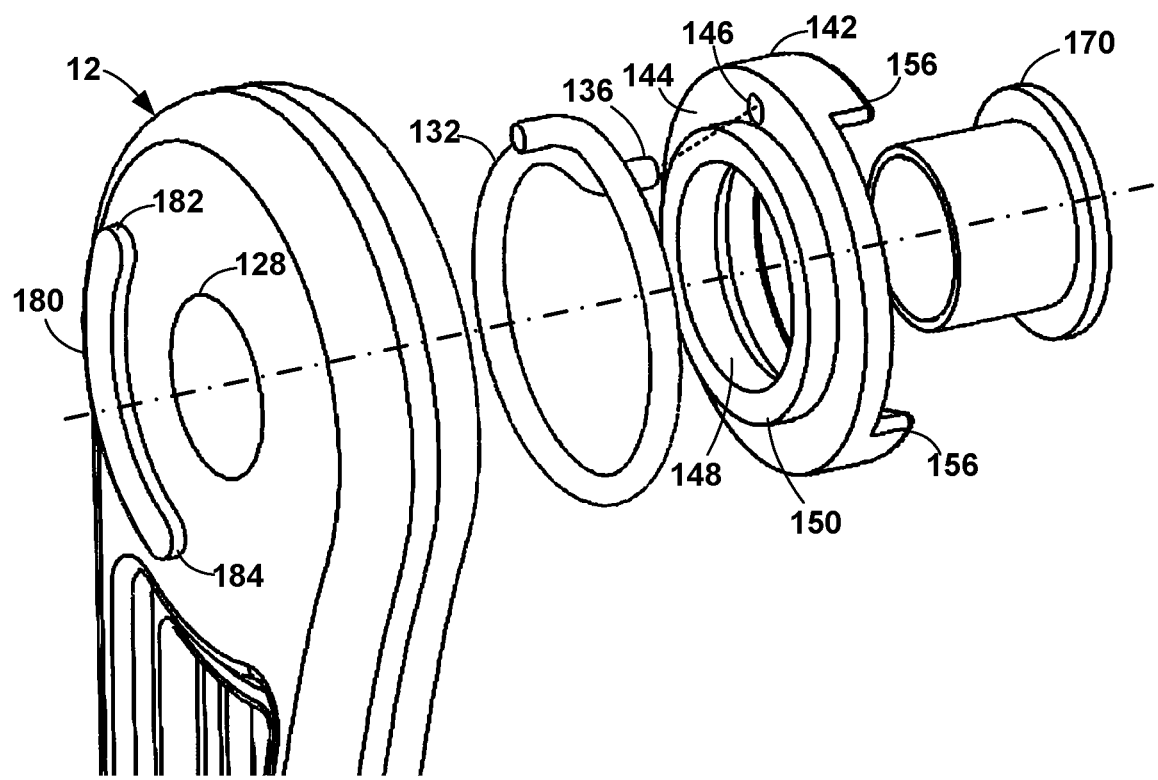
FIG. 6 is an exploded view of the brake end of the tether from the left side.

As shown in FIGS. 1-3, the through brake hole 46 is for attaching the friction brake 18, as described below. On the right side of the handle 12, a circular groove 130 surrounds a brake end hole 128 at the brake end 44 of the handle 12, as in FIGS. 4 and 5. A circular torsion spring 132 fits into the groove 130. The groove end 134 of the spring 132 fits into a curved slot 138 in the floor of the groove 130 that extends partially around the groove 130. The collar end 136 of the spring 132 fits into a hole 146 in the inner surface 144 of a collar 142, as shown in FIG. 6. The collar 142 is circular with an axial through hole 148 that aligns with the brake end hole 128. An annular ridge 150 extending from the inner surface of the collar 142 and surrounding the through hole 148 fits into the groove 130 inside the spring 132. The spring 132 surrounds the ridge 150, keeping the spring 132 centered in the groove 130. The ridge 150 keeps the through hole 148 aligned with the brake end hole 128.

Figure 4:
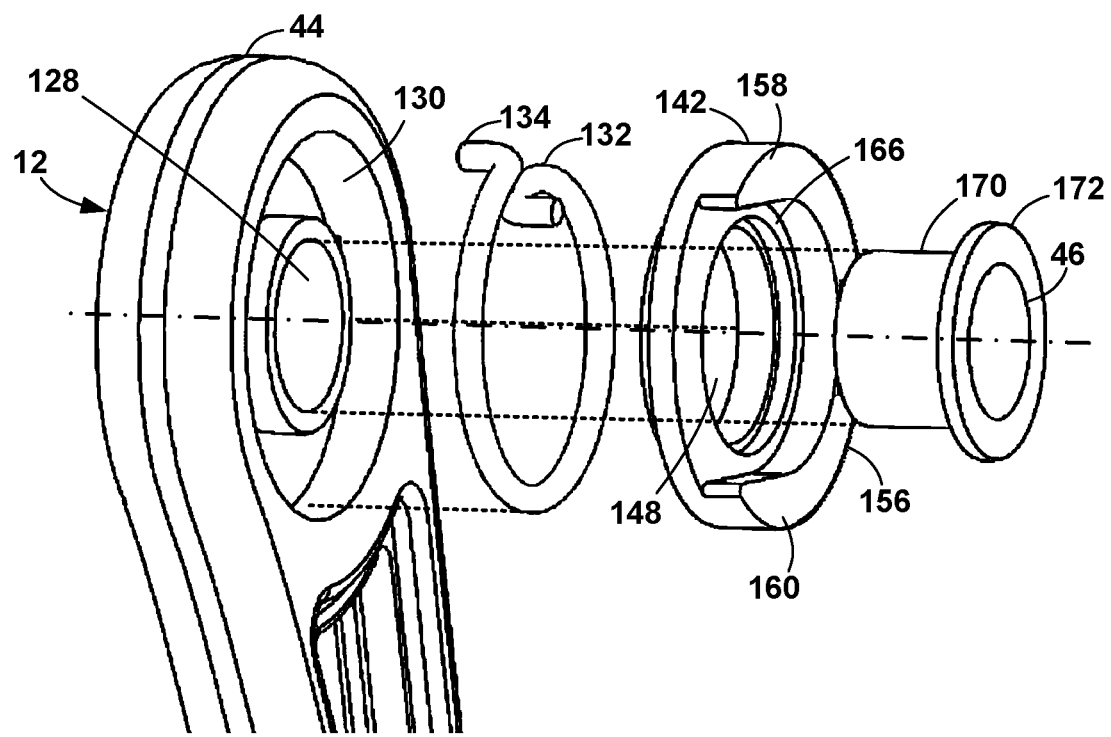
FIG. 4 is an exploded view of the brake end of the tether from the right side.

Shown in FIG. 4, a jaw 156 protruding from the outside surface of the collar 142 extends around 180° of the through hole 148 and the two jaw ends 158, 160 extend tangentially away from the through hole 148 to the perimeter 162 of the collar 142.

The collar 142 and torsion spring 132 are retained in the groove 30 by a press fit sleeve 170. The sleeve 170 is slightly larger in diameter than that brake end hole 128 so that it is securely retained in the brake end hole 128 by friction. The through hole 148 of the collar 142 has a discontinuity in its diameter that produces an outside-facing shoulder 166. An annular lip 172 on the sleeve 170 abuts the shoulder 166 to retain the collar 142 and torsion spring 132 in the groove 130.

The brake hole 46 is the through hole of the sleeve 170.

The right side of the brake end 44 has a brake stop 180. The purpose and operation of the torsion spring 132, collar 142, and brake stop 180 are described below.

Figure 7:
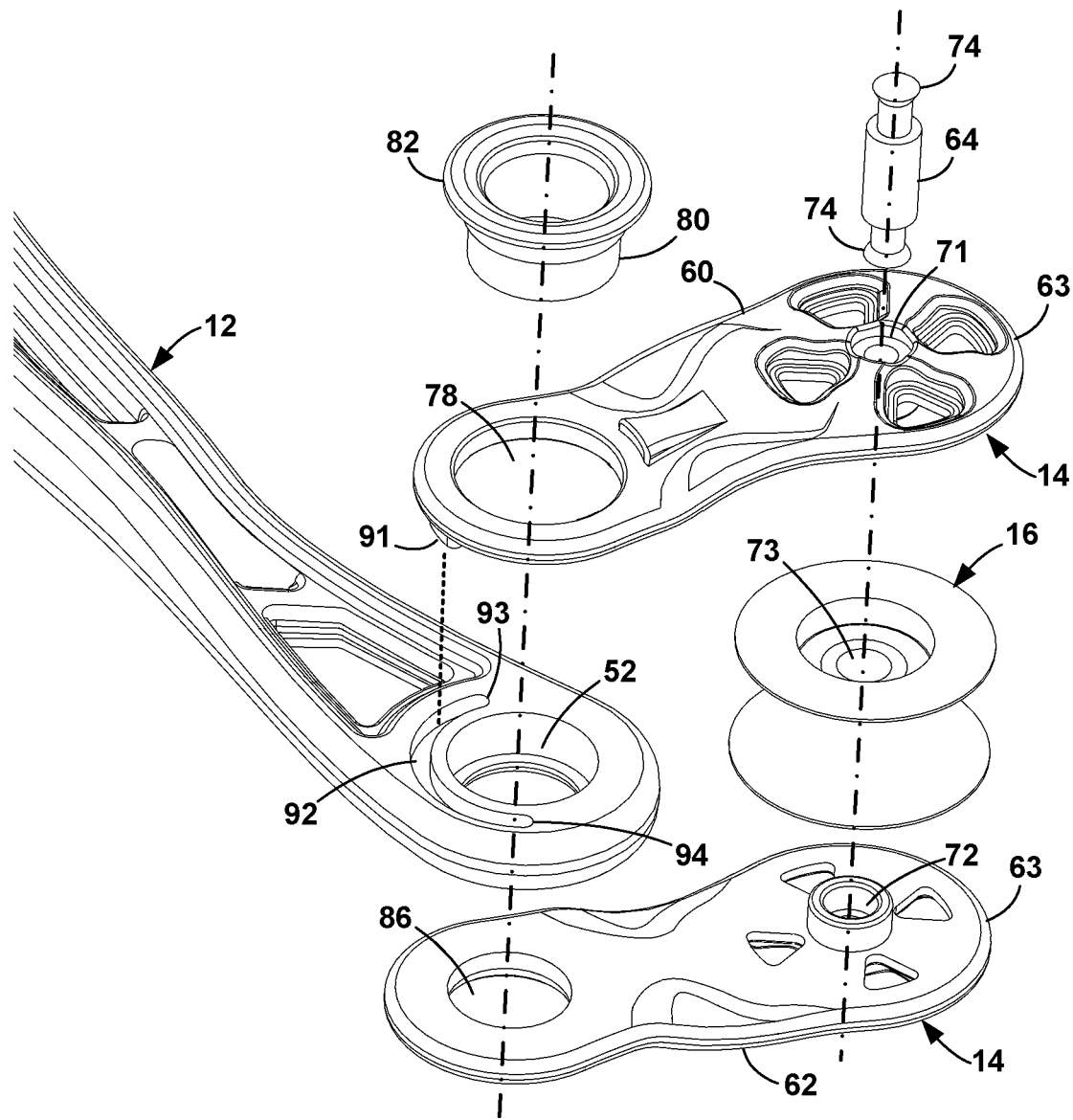
FIG. 7 is an exploded view of the pulley end of the tether.

As shown in FIG. 7, the pulley arm 14 has two elongated, parallel plates, the fixed plate 60 and the gate plate 62. An axle 64 extends perpendicularly between the plates 60, 62 adjacent to a pulley end 63. The pulley 16 is mounted to freely spin on the axle 64 between the plates 60, 62. The pulley 16 spaces the plates 60, 62 apart, as at 68, and leaves minimum gaps between the pulley 16 and the plates 60, 62.

Figure 8:
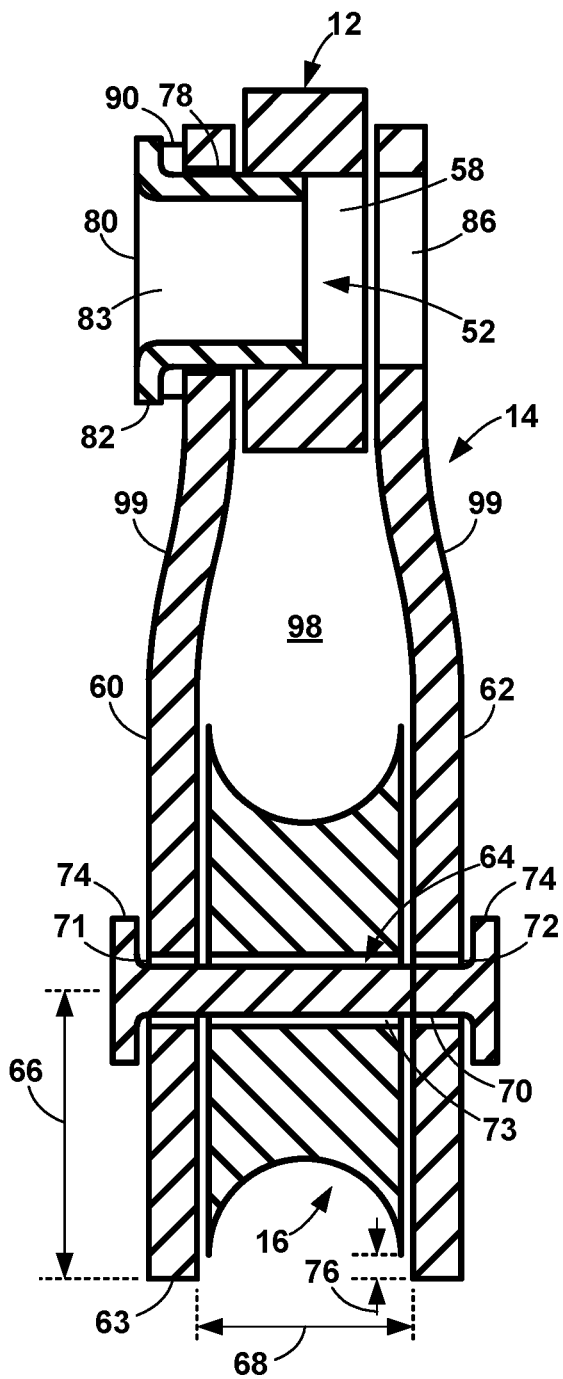
FIG. 8 is a cross-sectional view of the pulley arm, pulley, and handle.

As shown in FIG. 8, in the present design, the axle 64 is a rod 70 that extends through aligned holes 71, 72 in the plates 60, 62 and an axial hole 73 in the pulley 18. The ends of the rod 70 are flared, as at 74, to secure the assembly together.

Optionally, the gate plate 62 can pivot on the axle 64. Allowing the gate plate 62 to pivot provides access for inserting a rope 2 in the event that the end of the rope 2 is not readily accessible, as described below.

The distance 66 from the pulley end 63 to the axle 64 is determined by the radius of the pulley 16. Preferably, the distance 66 is at least equal to the radius of the pulley 16. Further, it is preferred that the perimeters of the plates 60, 62 extend to or beyond the entire perimeter of the pulley 16, as at 76, so that the pulley 16 is completely within the perimeter of the plates 60, 62 and not exposed to be damaged or to cause damage when the pulley 16 spins.

The other end of the fixed plate 60 has a handle hole 78 that is the same or larger than and coaxial with a pulley end hole 58 at the pulley end 50 of the handle 12. The fixed plate 60 is attached to the handle 12 by a press fit sleeve 80, as shown in FIG. 8. One end of the sleeve 80 has an annular lip 82 that is larger than the handle hole 78. The sleeve 80 extends through the handle hole 78 and is press fit into the pulley end hole 58. The annular lip 80 retains that fixed plate against the handle 12. If the handle hole 78 is larger than the sleeve 80 and the annular lip 82 is not flush against the fixed plate 60, the fixed plate 60 can rotate about the pulley end hole 58. The present invention contemplates that any adequate method of attachment can be used.

The pulley hole 52 is formed from the hole 83 through the sleeve 80 and that part of the pulley end hole 58 that is not covered by the sleeve 80.

Figure 10:
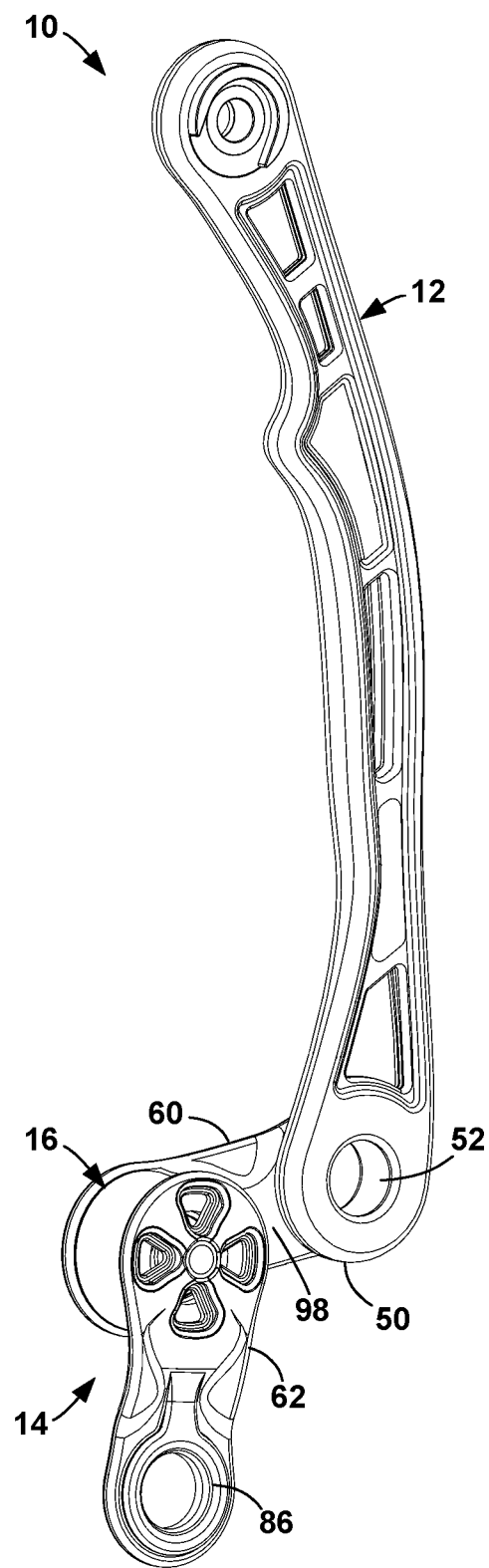
FIG. 10 is a perspective view of the tether with the gate plate open.

The other end of the gate plate 62 has a handle hole 86 that is approximately the same size as the pulley hole 52. Optionally, as described above, the gate plate 62 can be rotated about the pulley axle 64, as in FIG. 10, between a closed position and an open position. In the closed position, the gate plate handle hole 86 is aligned with the pulley hole 52. In the open position, shown in FIG. 10, the gate plate handle hole 86 is not aligned with the pulley hole 52. The open and closed positions are described below.

Figure 9:
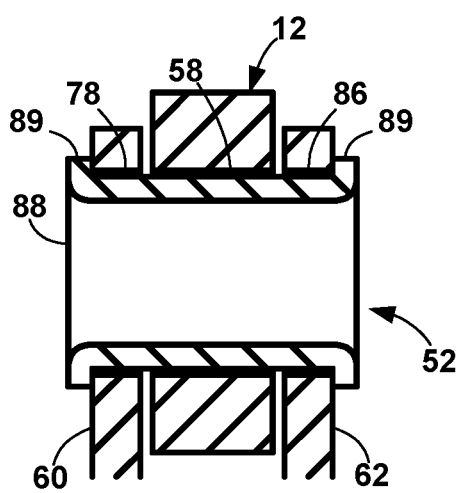
FIG. 9 is a cross-sectional view of another configuration of the attachment of the pulley arm to the handle.

Alternatively, if the gate plate 62 does not need to rotate about the pulley axle 64, the gate plate 62 can be fixed to the handle 12. In one method of attachment, shown in FIG. 9, a sleeve 88 is inserted through the fixed plate handle hole 78, the pulley end hole 58, and the gate plate handle hole 86, and then an annular lip 89 is formed at each end. The present invention contemplates that any adequate attachment method can be used.

In some designs, the pulley 16 is thicker than the handle 12. In such a case, the fixed plate 60 and gate plate 62 need to accommodate the difference in thickness. As seen in FIG. 8, an S curve 99 in the plates 60, 62 can accommodate any difference. The plates 60, 62 curve toward each other from the pulley 16 to the handle 12 if the pulley 16 is thicker than the handle 12. The plates 60, 62 curve toward each other from the handle 12 to the pulley 16 if the handle 12 is thicker than the pulley 16. The amount of curvature will depend on the difference in thickness between the pulley 16 and handle 12.

The fixed plate 60, gate plate 62, pulley 16, and handle 12 define a rope slot 98. The open position of the gate plate 62 provides access to the rope slot 98 through the side of the slot 98. The closed position of the gate plate 62 closes the side of the rope slot 98 so that the rope 2 is retained within the slot 98. The slot 98 is large enough so that a rope 2 can fit through and reciprocate freely within it, as described below.

In the present implementation, the pulley 16 has a diameter of 38 mm and a thickness of 20 mm. The diameter of the pulley hole 52 is 18 mm and the distance between the center of the pulley hole 52 and the center of the pulley 16 is 55 mm. The rope slot 98 is in the range of from about 17 mm to about 23 mm depending on the orientation of the pulley arm 14 to the handle 12, as described below.

The pulley 16 and the components of the pulley arm 14 are composed of rigid materials, such as those described above with reference to the handle 12.

As mentioned above, the friction brake 18 is described in U.S. Pat. No. 8,851,232. In summary, the friction brake 18 has two elongated, spaced side members 100, 102, each having a climbing rope end 104 and a tethering end 106. Two parallel friction elements 108, 110 extend between the climbing rope ends 104 and are spaced apart for receiving a rope 2 therebetween. A tethering connector 112 in the form of a dowel extends between tethering connector holes 114 in the tethering ends 106 for connecting a tether thereto.

Figure 11:
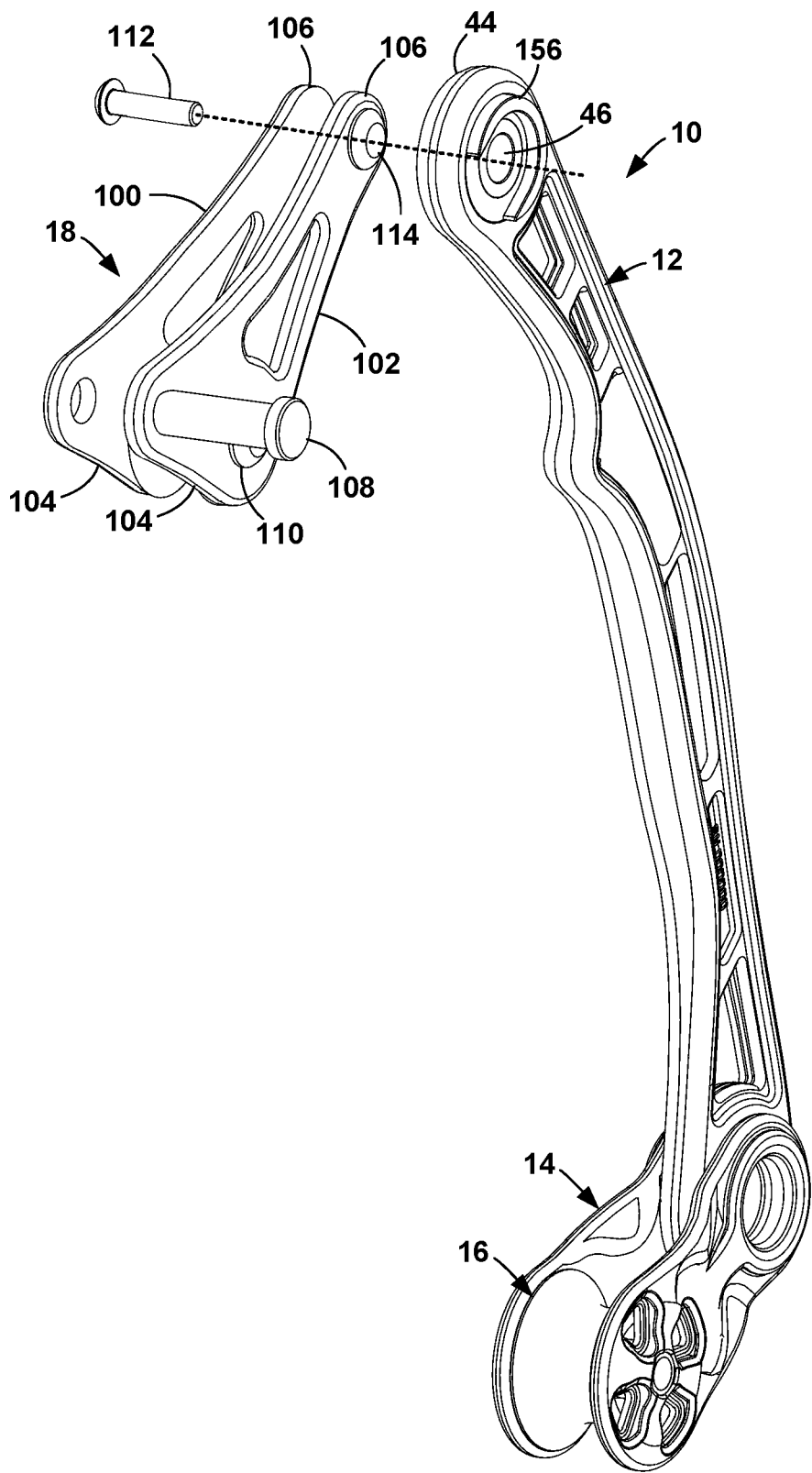
FIG. 11 is a perspective, exploded view of the friction brake being assembled to the brake end of the tether.
Figure 12:
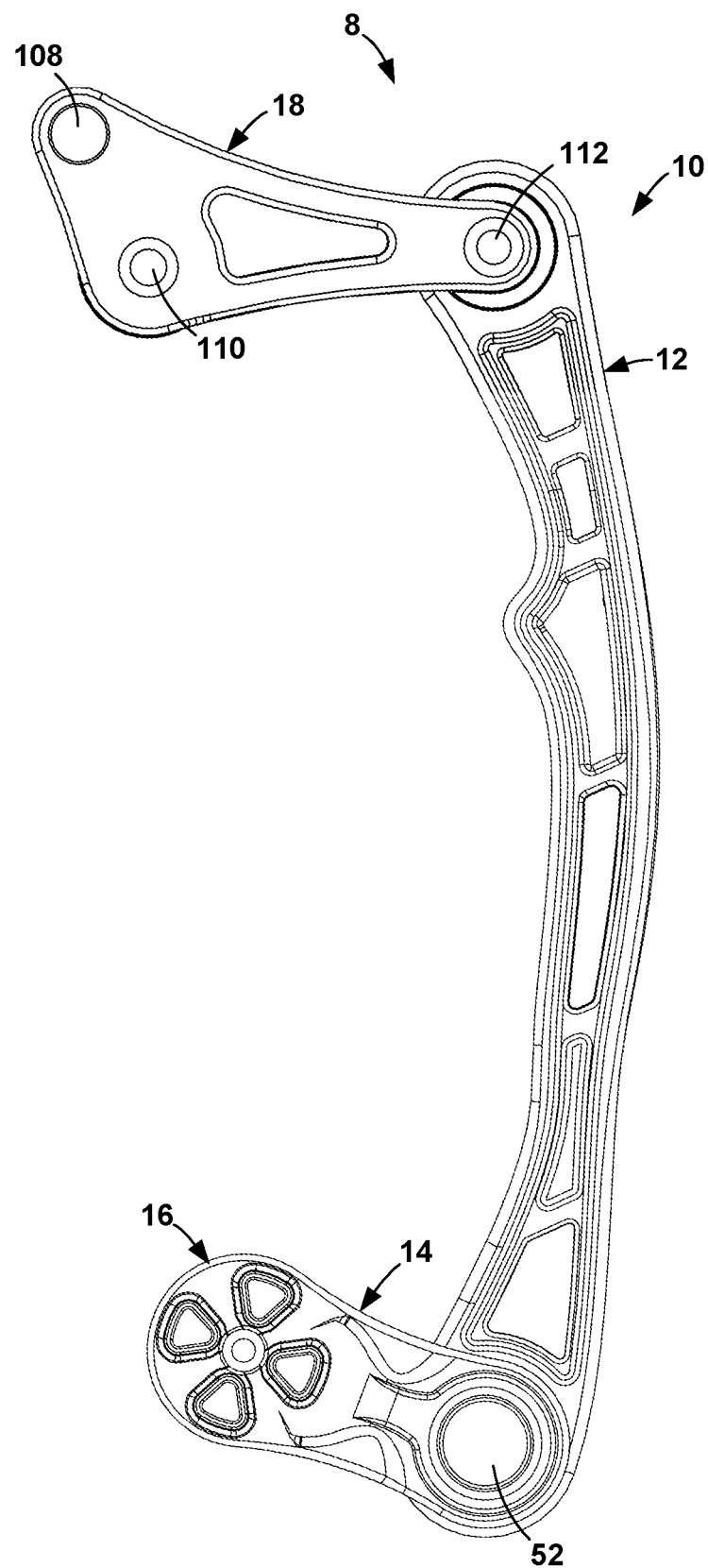
FIG. 12 is a perspective, exploded view of the friction brake being assembled to the brake end of the tether.

To use the tether 10 of the present invention, the friction brake 18 is first attached to the tether 10, as shown in FIGS. 11 and 12. To do so, the tethering connector 112 is removed from the friction brake 18. The brake end 44 of the handle 12 is inserted between the side members 100, 102 such that the tethering connector holes 114 are aligned with the brake hole 44 and the right side member 100 is inside and captured by the collar jaw 156, and the left side member 102 does not overlap the brake stop 180. The tethering connector 112 is reinstalled, thereby securing the friction brake 18 to the tether 10 to form the tether/friction brake assembly 8. In one configuration, the tethering connector 112 is a removable pin. In another configuration, the tethering connector 112 is a threaded rod with nuts at each end.

The present invention also contemplates that the friction brake 18 is permanently attached to the handle 10 such as by rivet or similar attachment.

Figure 15:
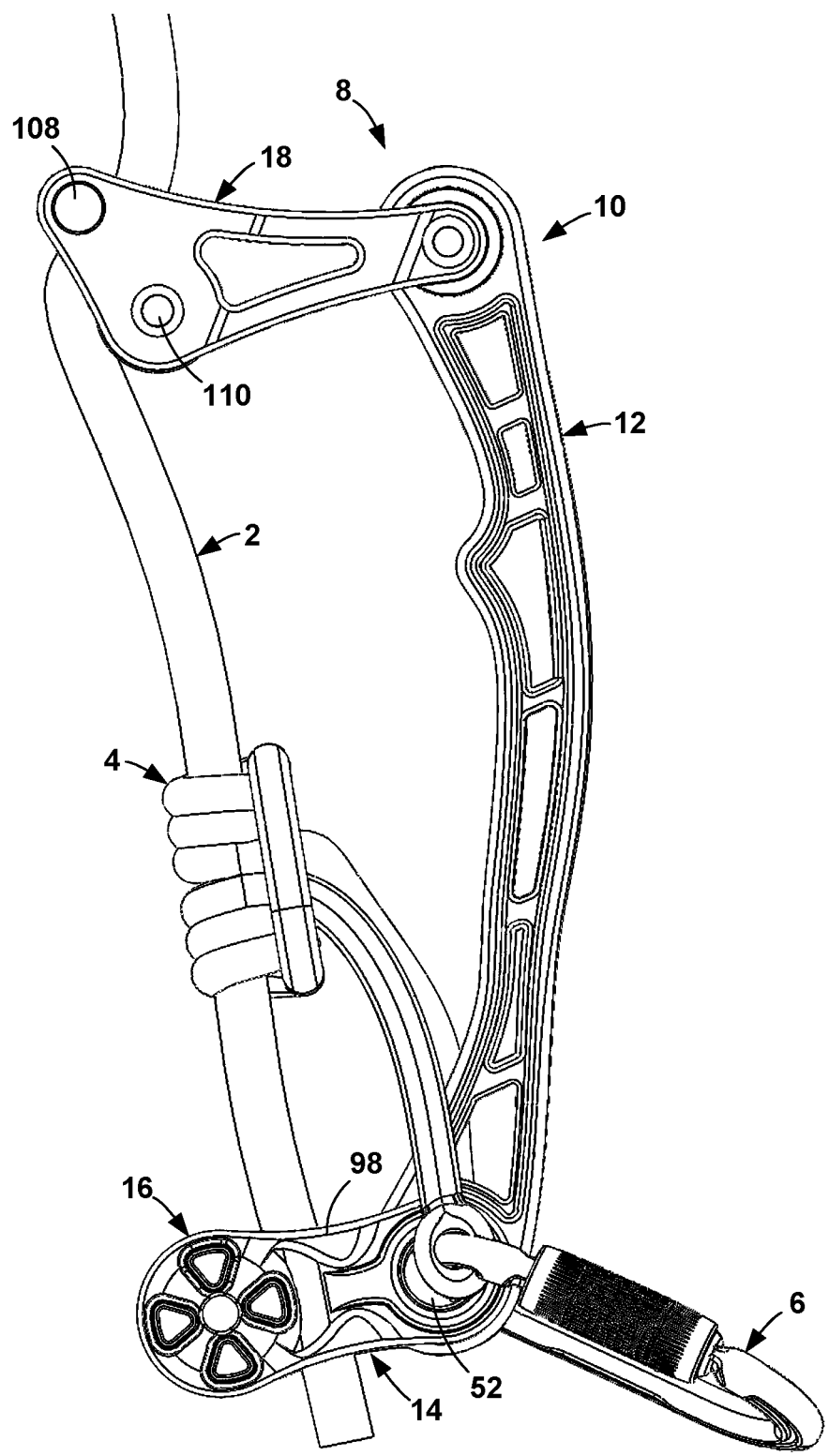
FIG. 15 is a side view of the tether and friction brake assembly assembled to a rope.

The tether/friction brake assembly 8 is used generally as described above with reference to the '232 Patent. The assembly 8 is installed on the rope 2 as shown in FIG. 15. The rope 2 is inserted between the friction elements 108, 110 of the friction brake 18 and then through the pulley arm slot 98. If using the end of the rope 2, the rope end can be threaded through the friction brake 18 and pulley arm rope slot 98. If the end of the rope 2 is not available, the rope 2 is installed in the friction brake 18 as described in the '232 Patent.

Figure 13:
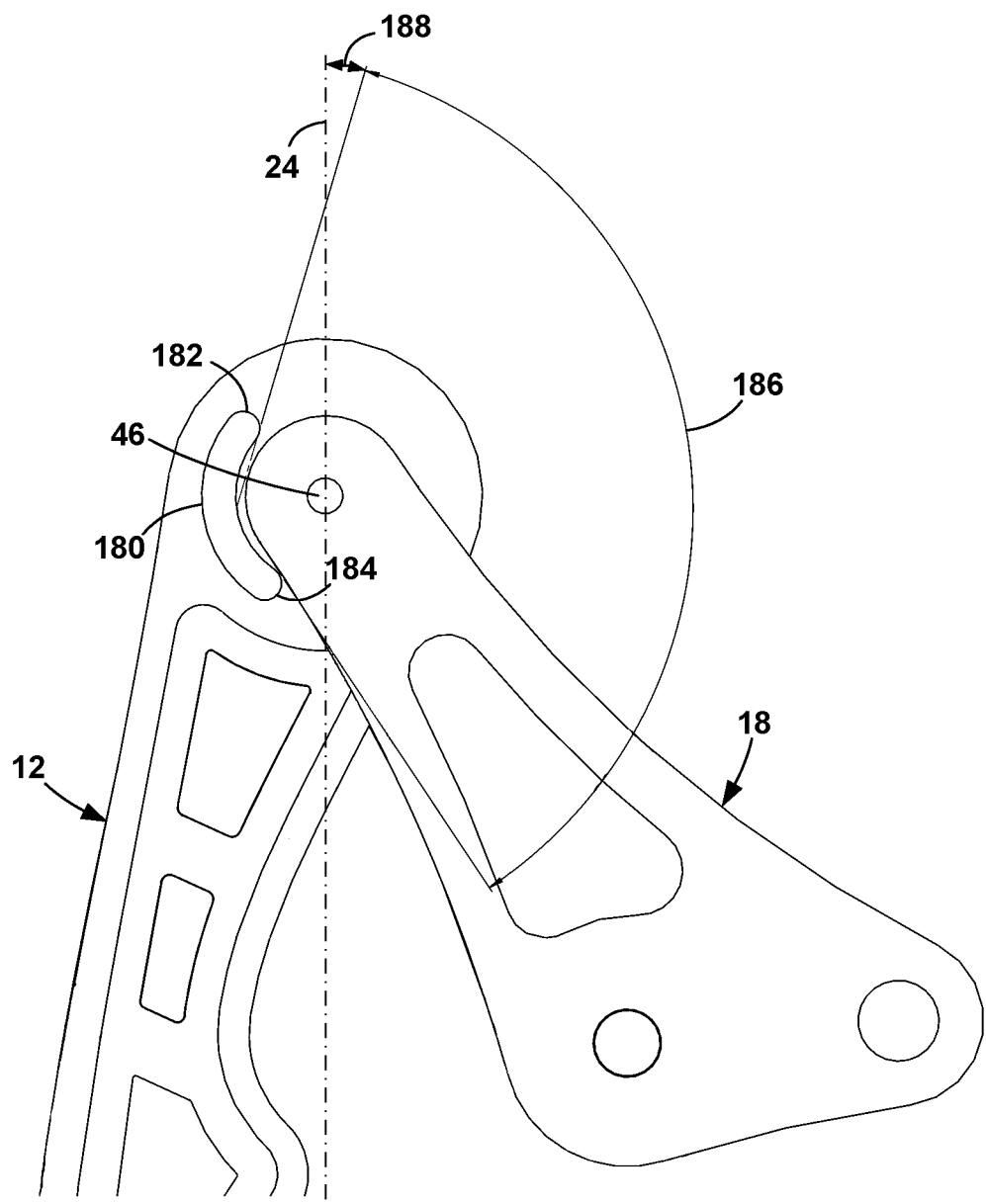
FIG. 13 is a side view of the rotation range of the friction brake.

The friction brake stop 180 limits the range of rotation of the friction brake 18 between a brake position and a free position. As shown in FIG. 13, the brake stop 180 is a curved ridge that extends partially around the brake hole 46. Alternatively, the brake stop 180 is a pair of studs (not shown), one at the location of each end of where the curved ridge is shown in FIG. 13.

When the friction brake 18 is against the upper stop 182, it is in the brake position. In the present implementation, the brake position is at an angle of about 10° from the handle axis 24, as at 188. The friction brake 18 rotates downwardly against the lower stop 184, where the friction brake 18 is in the free position. In the present implementation, the lower stop 184 allows the friction brake 18 to rotate up to about 130°, as at 186.

If the friction brake 18 is allowed to rotate fully downwardly to the free position, as in FIG. 13, the friction elements 108, 110 would be oriented such that the rope 2 between the friction elements 108, 110 may not be engaged enough with the friction elements 108, 110 to grab the rope 2 when braking is needed. Because the friction brake 18 is captured by the jaw 156, the spring 132 biases the friction brake 18 upwardly, but only at the bottom 25° or so of the rotation angle. As the friction brake 18 rotates downwardly from the brake position to the free position, the spring 132 initially has no effect on the rotation because the slot end 134 of the spring 132 slides within the curved slot 138 in the circular groove 130. As the slot end 138 of the spring 132 reaches the end of the slot 130, at about 25° from the free position, the spring 132 becomes tensioned and keeps the friction brake 18 from continuing to rotate to the free position. In this tensioned position, shown in FIG. 15, the friction elements 108, 110 are oriented such that the rope 2 engages the friction elements 108, 110, that is, the rope 2 traverses an S bend around the friction elements 108, 110. The bias of the spring 132 can be overcome to rotate the friction brake 18 fully to the free position by downward pressure on the friction brake 18.

The rope 2 is installed in the pulley arm 14 by pivoting the gate plate 62 away from the handle 12 to the open position, placing the rope 2 in the pulley arm rope slot 98 and pivoting the gate plate 62 to the closed position. A pulley arm carabiner 6 is installed in the aligned pulley hole 52 and gate plate handle hole 86 to retain the gate plate 62 in the closed position.

Figure 14:
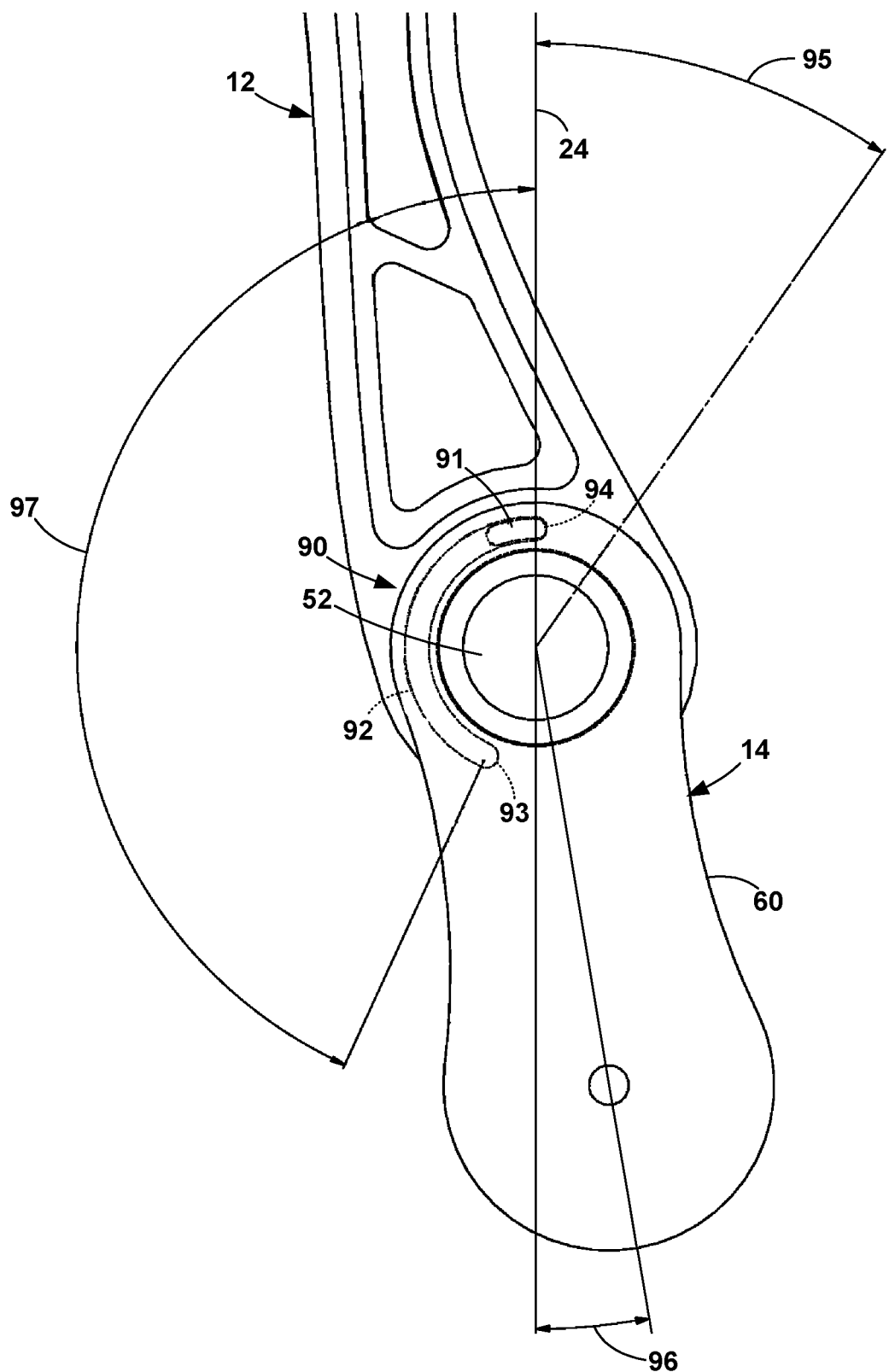
FIG. 14 is a side view of the rotation range of the pulley arm.

Optionally, if the fixed plate 60 can rotate about the pulley end hole 58, a stop 90 limits the range of rotation in order to retain the pulley 16 within the optimal orientation relative to the handle 12, as shown in FIG. 14. In the design of FIGS. 7 and 14, a tab 91 extending toward the handle 12 from the fixed plate 60 fits into a curved groove 92 in the handle 12. The groove 92 has a circular curve that is coaxial with the pulley end hole 58. The fixed plate 60 rotates between a forward position, when the tab 91 is at the forward stop 93 end of the groove 92, and a backward position, when the tab 91 is at the backward stop 94 end of the groove 92, shown in FIG. 14. Any other method of providing stops is contemplated by the present invention.

If the pulley arm 16 was permitted to rotate forward to the handle 12, the rope 2 would be crimped between the pulley 16 and the handle 12. The forward stop 93 prevents this. In the present implementation, the forward stop 93 is at 35° from the front of the handle axis 24, as at 95. If the pulley arm 16 was permitted to rotate backward to the handle 12, users may attempt to use the tether 10 incorrectly, either accidently or intentionally. The backward stop 94 prevents this. In the present implementation, the backward stop 94 is at 10° from the front of the handle axis 24, as at 96. With the present implementation of the two stops 93, 94, the pulley arm 14 rotates a maximum of 135°, as at 97.

A friction hitch 4, such as a split tail Blake's hitch or similar, is installed on the rope 2 between the friction brake 18 and the pulley 16 and attached to the pulley arm carabiner 6.

When ascending the rope 2, the friction brake 18 is held in the tensioned position by the spring 132, as in FIG. 15. In the neutral position, the rope 2 is bent in a slightly S shape so that it contacts both friction elements 108, 110. The climber may use a conventional ascender to assist in the ascent. The climber pulls the assembly 8 up the rope 2 by the handle 12 as the climber ascends.

When the climber desires to descend, the climber engages the friction brake 18 by pulling the handle 12 downward so that the friction brake 18 is in the brake position. After the friction brake is in the brake position, the climber then can disengage the friction hitch 4 and slowly descend down the rope 2.

Thus, it has been shown and described a rigid friction brake tether. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A friction brake tether comprising:
   (a) an elongated rigid handle having a brake end and a pulley end, the brake end having a through brake hole designed to receive a friction brake and the pulley end having a through pulley hole;
   (b) a pulley arm including a fixed plate, a gate plate generally parallel to the fixed plate, and an axle extending between the fixed plate and gate plate adjacent to a pulley end, the fixed plate having a handle hole adjacent to a handle end, the gate plate having a handle hole adjacent to a handle end, the fixed plate being permanently mounted to the handle to rotate relative to the handle adjacent to the pulley end;
   (c) a pulley mounted between the fixed plate and the gate plate to rotate on the axle; and
   (d) a rope slot defined by the fixed plate, the gate plate, the pulley, and the handle, the slot designed to receive a rope such that the rope can reciprocate freely through the slot.

2. The friction brake tether of claim 1 wherein the handle is shaped to fit in a user's hand.

3. The friction brake tether of claim 1 wherein the fixed plate is permanently mounted to rotate relative to the handle by attaching the fixed plate handle hole at the pulley hole such that the fixed plate handle hole is axially aligned with and rotatable about the pulley hole.

4. The friction brake tether of claim 1 wherein the gate plate is rotatable about the pulley axle between a closed position, wherein the gate plate handle hole is axially aligned with the pulley hole, and an open position, wherein the gate plate handle hole is not aligned with the pulley hole and provides access to the rope slot.

5. The friction brake tether of claim 1 wherein the fixed plate rotates relative to the handle between stops that limit rotation of the fixed plate.

6. The friction brake tether of claim 1 further comprising an open-sided jaw mounted to rotate about the brake hole and designed to capture the friction brake.

7. The friction brake tether of claim 6 wherein the jaw rotates about the brake hole between a free position at a lower stop and a brake position at an upper stop.

8. The friction brake tether of claim 7 further comprising a spring that biases the jaw away from the free position to a tensioned position between the free position and the brake position.

9. A friction brake tether comprising:
   (a) an elongated rigid handle shaped to fit in a user's hand and having a brake end and a pulley end, the brake end having a through brake hole and the pulley end having a through pulley hole;
   (b) a pulley arm including a fixed plate, a gate plate generally parallel to the fixed plate, and an axle extending between the fixed plate and gate plate adjacent to a pulley end, the fixed plate having a handle hole adjacent to a handle end, the gate plate having a handle hole adjacent to a handle end, the fixed plate being permanently mounted to rotate relative to the handle adjacent to the pulley end between stops that limit rotation of the fixed plate, the gate plate being rotatable about the pulley axle between a closed position, wherein the gate plate handle hole is axially aligned with the pulley hole, and an open position, wherein the gate plate handle hole is not aligned with the pulley hole;
   (c) a pulley mounted between the fixed plate and the gate plate to rotate on the axle, the pulley being completely within the perimeter of the fixed plate and the gate plate; and
   (d) a rope slot defined by the fixed plate, the gate plate, the pulley, and the handle, the slot designed to receive a rope such that the rope can reciprocate freely through the slot, the slot being accessible when the gate plate is in the open position.

10. The friction brake tether of claim 9 wherein the fixed plate is permanently mounted to rotate relative to the handle adjacent to the pulley end by attaching the fixed plate handle hole at the pulley hole such that the fixed plate handle hole is axially aligned with and rotatable about the pulley hole.

11. The friction brake tether of claim 9 further comprising an open-sided jaw mounted to rotate about the brake hole between a free position at a lower stop and a brake position at an upper stop, the jaw designed to capture the friction brake.

12. The friction brake tether of claim 11 further comprising a spring that biases the jaw away from the free position to a tensioned position between the free position and the brake position.

13. A friction brake tether assembly comprising:
   (a) an elongated rigid handle having a brake end and a pulley end, the brake end having a through brake hole and the pulley end having a through pulley hole;
   (b) a friction brake mounted to rotate about the brake hole;
   (c) a pulley arm including a fixed plate, a gate plate generally parallel to the fixed plate, and an axle extending between the fixed plate and gate plate adjacent to a pulley end, the fixed plate having a handle hole adjacent to a handle end, the gate plate having a handle hole adjacent to a handle end, the fixed plate being permanently mounted to rotate relative to the handle adjacent to the pulley end;
   (d) a pulley mounted to rotate on the axle between the fixed plate and the gate plate;
   (e) a rope slot defined by the fixed plate, the gate plate, the pulley, and the handle, the slot designed to receive a rope such that the rope can reciprocate freely through the slot.

14. The friction brake tether assembly of claim 13 wherein the handle is shaped to fit in a user's hand.

15. The friction brake tether assembly of claim 13 wherein the fixed plate is mounted to rotate relative to the handle adjacent to the pulley end by attaching the fixed plate handle hole at the pulley hole such that the fixed plate handle hole is axially aligned with and rotatable about the pulley hole.

16. The friction brake tether assembly of claim 13 wherein the gate plate is rotatable about the pulley axle between a closed position, wherein the gate plate handle hole is axially aligned with the pulley hole, and an open position, wherein the gate plate handle hole is not aligned with the pulley hole and provides access to the rope slot.

17. The friction brake tether assembly of claim 13 wherein the fixed plate rotates relative to the handle between stops that limit rotation of the fixed plate.

18. The friction brake tether assembly of claim 13 wherein the friction brake is captured by a jaw that is mounted to rotate about the brake hole.

19. The friction brake tether assembly of claim 18 wherein the jaw rotates about the brake hole between a free position at a lower stop and a brake position at an upper stop.

20. The friction brake tether assembly of claim 19 further comprising a spring that biases the jaw away from the free position to a tensioned position between the free position and the brake position.

21. A friction brake tether assembly comprising:
(a) an elongated rigid handle shaped to fit in a user's hand and having a brake end and a pulley end, the brake end having a through brake hole and the pulley end having a through pulley hole;
(b) a friction brake mounted to rotate about the brake hole;
(c) a pulley arm including a fixed plate, a gate plate generally parallel to the fixed plate, and an axle extending between the fixed plate and gate plate adjacent to a pulley end, the fixed plate having a handle hole adjacent to a handle end, the gate plate having a handle hole adjacent to a handle end, the fixed plate being permanently mounted to rotate relative to the handle adjacent to the pulley end between stops that limit rotation of the fixed plate, the gate plate being rotatable about the pulley axle between a closed position, wherein the gate plate handle hole is axially aligned with the pulley hole, and an open position, wherein the gate plate handle hole is not aligned with the pulley hole;
(d) a pulley mounted between the fixed plate and the gate plate to rotate on the axle, the pulley being completely within the perimeter of the fixed plate and the gate plate; and
(e) a rope slot defined by the fixed plate, the gate plate, the pulley, and the handle, the slot designed to receive a rope such that the rope can reciprocate freely through the slot, the slot being accessible when the gate plate is in the open position.

22. The friction brake tether assembly of claim 21 wherein the fixed plate is mounted to rotate relative to the handle adjacent to the pulley end by attaching the fixed plate handle hole at the pulley hole such that the fixed plate handle hole is axially aligned with and rotatable about the pulley hole.

23. The friction brake tether assembly of claim 21 further comprising an open-sided jaw mounted to rotate about the brake hole between a free position at a lower stop and a brake position at an upper stop, the jaw designed to capture the friction brake.

24. The friction brake tether assembly of claim 23 further comprising a spring that biases the jaw away from the free position to a tensioned position between the free position and the brake position.

* * * * *